(12) United States Patent
Satake et al.

(10) Patent No.: US 12,049,541 B2
(45) Date of Patent: Jul. 30, 2024

(54) POLYESTER RESIN COMPOSITION

(71) Applicant: Mitsubishi Gas Chemical Company, Inc., Chiyoda-ku (JP)

(72) Inventors: Yuichiro Satake, Hiratsuka (JP); Manabu Hirakawa, Hiratsuka (JP); Yasuaki Yoshimura, Hiratsuka (JP); Eiichi Honda, Hiratsuka (JP)

(73) Assignee: Mitsubishi Gas Chemical Company, Inc., Chiyoda-ku (JP)

( * ) Notice: Subject to any disclaimer, the term of this patent is extended or adjusted under 35 U.S.C. 154(b) by 873 days.

(21) Appl. No.: 17/045,041

(22) PCT Filed: Apr. 1, 2019

(86) PCT No.: PCT/JP2019/014437
§ 371 (c)(1),
(2) Date: Oct. 2, 2020

(87) PCT Pub. No.: WO2019/194117
PCT Pub. Date: Oct. 10, 2019

(65) Prior Publication Data
US 2021/0147619 A1  May 20, 2021

(30) Foreign Application Priority Data
Apr. 4, 2018 (JP) ................. 2018-072574

(51) Int. Cl.
*C08G 63/60* (2006.01)
*C08G 63/06* (2006.01)
*C08K 5/13* (2006.01)
*C08K 5/526* (2006.01)
*C08K 5/527* (2006.01)
*C08L 67/02* (2006.01)
*C08G 63/18* (2006.01)
*C08G 63/199* (2006.01)

(52) U.S. Cl.
CPC ............ *C08G 63/60* (2013.01); *C08G 63/06* (2013.01); *C08K 5/13* (2013.01); *C08K 5/526* (2013.01); *C08K 5/527* (2013.01); *C08L 67/02* (2013.01); *C08G 63/18* (2013.01); *C08G 63/199* (2013.01)

(58) Field of Classification Search
CPC ...... C08G 63/60; C08G 63/18; C08G 63/199; C08L 67/02
See application file for complete search history.

(56) References Cited

U.S. PATENT DOCUMENTS

| | | | | |
|---|---|---|---|---|
| 3,625,877 A | * | 12/1971 | Jackson, Jr. | ......... C08K 5/0008 524/371 |
| 6,861,468 B2 | * | 3/2005 | Yoshida | ................. C08L 67/02 523/210 |
| 8,361,577 B2 | * | 1/2013 | Arpin | ...................... C08L 67/02 524/80 |
| 9,975,843 B2 | * | 5/2018 | Motoi | ................... C07C 29/141 |
| 10,048,404 B2 | * | 8/2018 | Kato | ....................... G02B 1/04 |
| 10,287,391 B2 | * | 5/2019 | Honda | ................... C08G 63/78 |
| 10,605,956 B2 | * | 3/2020 | Kato | ................... C08G 64/305 |
| 10,689,487 B2 | * | 6/2020 | Hirakawa | ............. C08G 64/02 |
| 10,889,684 B2 | * | 1/2021 | Satake | ................. C08G 63/199 |
| 10,894,859 B2 | * | 1/2021 | Honda | .................. C08G 63/18 |
| 10,947,342 B2 | * | 3/2021 | Yoshimura | ........... C08G 63/199 |
| 10,981,366 B2 | * | 4/2021 | Honda | ..................... C08J 7/048 |
| 11,016,232 B2 | * | 5/2021 | Yoshimura | ............. C08G 63/60 |
| 11,236,198 B2 | * | 2/2022 | Honda | ................ B29C 45/0001 |
| 2017/0306080 A1 | | 10/2017 | Furuko et al. | |
| 2018/0050978 A1 | * | 2/2018 | Watanabe | ............. C07C 67/313 |
| 2018/0142059 A1 | | 5/2018 | Honda et al. | |
| 2020/0031108 A1 | | 1/2020 | Honda et al. | |
| 2020/0031990 A1 | | 1/2020 | Yoshimura et al. | |
| 2020/0247944 A1 | | 8/2020 | Honda et al. | |

FOREIGN PATENT DOCUMENTS

| | | |
|---|---|---|
| CN | 107614569 A | 1/2018 |
| CN | 109790283 A | 5/2019 |
| EP | 3 521 334 A1 | 8/2019 |
| JP | 47-9418 | 3/1972 |
| JP | 11-217481 A | 8/1999 |
| JP | 2007-161917 A | 6/2007 |
| JP | 2008-189902 A | 8/2008 |

(Continued)

OTHER PUBLICATIONS

International Search Report issued on Jun. 25, 2019 in PCT/JP2019/014437 filed on Apr. 1, 2019, 2 pages.

*Primary Examiner* — Rip A Lee

(74) *Attorney, Agent, or Firm* — Oblon, McClelland, Maier & Neustadt, L.L.P.

(57) ABSTRACT

A polyester resin composition containing:
a polyester resin containing a unit (A) represented by the following general formula (1); and
an antioxidant:

$$\left[ -O-\underset{R_2}{\overset{R_1}{\underset{|}{\underset{|}{\bigg\langle}}}}-\underset{R_3}{\overset{O}{\underset{\|}{C}}}- \right]_n \quad (1)$$

wherein $R_1$ is a hydrogen atom, $CH_3$ or $C_2H_5$, $R_2$ and $R_3$ are each independently a hydrogen atom or $CH_3$, and n is 0 or 1.

10 Claims, No Drawings

(56) References Cited

FOREIGN PATENT DOCUMENTS

| | | |
|---|---|---|
| JP | 2019-26738 A | 2/2019 |
| KR | 2011-0038042 | 4/2011 |
| KR | 2018-0012781 | 2/2018 |
| TW | 201704288 A | 2/2017 |
| WO | WO 2012/035874 A1 | 3/2012 |
| WO | WO 2012/035875 A1 | 3/2012 |
| WO | WO 2016/052302 A1 | 4/2016 |
| WO | WO 2016/153018 A1 | 9/2016 |
| WO | WO 2016/190317 A1 * 12/2016 ............. C08G 63/06 |
| WO | WO 2018/062325 A1 | 4/2018 |
| WO | WO 2018/062327 A1 | 4/2018 |
| WO | WO 2018/062328 A1 | 4/2018 |

* cited by examiner

POLYESTER RESIN COMPOSITION

TECHNICAL FIELD

The present invention relates to a polyester resin composition.

BACKGROUND ART

In recent years, a transparent resin may be used in an environment where the temperature becomes extremely high, such as the inside of an automobile. In that case, it is required that, in addition to the transparency of the resin, yellowing of the resin due to heat does not easily occur.

A cycloolefin polymer (hereinafter, may be referred to as the "COP") described in Patent Literature 1 is a resin having high transparency and heat resistance, and can be utilized in applications that require transparency and heat resistance.

CITATION LIST

Patent Literature

Patent Literature 1: International Publication No. WO 2016/052302

SUMMARY OF INVENTION

Technical Problem

The COP described in Patent Literature 1 is improved to some extent in heat yellowing resistance. However, when such a COP is used in an environment where the temperature becomes high, such as the inside of an automobile; there is a problem that yellow coloring is observed, which results in impairing the transparency and appearance.

As described above, there is still room for improvement in the technology of Patent Literature 1 in view of providing a material that can sufficiently prevent yellow coloring that may occur due to the use in an environment where the temperature becomes high and that can also maintain transparency.

Solution to Problem

As a result of intensive investigations aimed at solving the above problem, the present inventors have found that a polyester resin composition comprising a polyester resin having a norbornane ring skeleton and an antioxidant can be a solution to the above problem, and have reached the present invention.

That is, the present invention is as follows.

[1]
A polyester resin composition comprising: a polyester resin comprising a unit (A) represented by the following general formula (1); and an antioxidant:

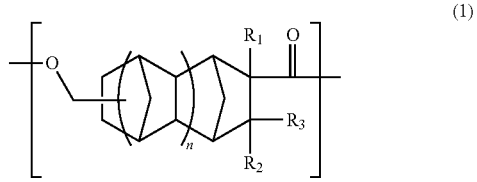

(1)

wherein $R_1$ is a hydrogen atom, $CH_3$ or $C_2H_5$, $R_2$ and $R_3$ are each independently a hydrogen atom or $CH_3$, and n is 0 or 1.

[2]
The polyester resin composition according to [1], wherein the polyester resin is a copolymerized polyester resin comprising the unit (A), a diol unit (B) and a unit (C) derived from a dicarboxylic acid or an ester-forming derivative of the dicarboxylic acid, and a content of the unit (A) based on total units of the copolymerized polyester resin is 10 to 95 mol %.

[3]
The polyester resin composition according to [1] or [2], wherein the antioxidant comprises a phenol-based antioxidant and/or a phosphorus-based antioxidant.

[4]
The polyester resin composition according to [3], wherein the phenol-based antioxidant comprises at least one selected from the group consisting of 1,3,5-tris(3,5-di-tert-butyl-4-hydroxybenzyl)-1,3,5-triazine-2,4,6(1H,3H,5H)-trione, 4,4′,4″-(1-methylpropanyl-3-ylidene)tris(6-tert-butyl-m-cresol), n-octadecyl 3-(3,5-di-tert-butyl-4-hydroxyphenyl)propionate, pentaerythritol tetrakis[3-(3,5-di-tert-butyl-4-hydroxyphenyl)propionate] and 3,9-bis(2-(3-(3-tert-butyl-4-hydroxy-5-methylphenyl)-propionyloxy)-1,1-dimethylethyl)-2,4,8,10-tetraoxaspiro[5.5]undecane.

[5]
The polyester resin composition according to [3] or [4], wherein the phosphorus-based antioxidant comprises at least one selected from the group consisting of tris(2,4-di-tert-butylphenyl) phosphite and 3,9-bis(2,6-di-tert-butyl-4-methylphenoxy)-2,4,8,10-tetraoxa-3,9-diphosphaspiro[5.5]undecane.

[6]
The polyester resin composition according to any one of [3] to [5], comprising
1,3,5-tris(3,5-di-tert-butyl-4-hydroxybenzyl)-1,3,5-triazine-2,4,6(1H,3H,5H)-trione and/or pentaerythritol tetrakis[3-(3,5-di-tert-butyl-4-hydroxyphenyl)propionate] as the phenol-based antioxidant, and
3,9-bis(2,6-di-tert-butyl-4-methylphenoxy)-2,4,8,10-tetraoxa-3,9-diphosphaspiro[5.5]undecane and/or tris(2,4-di-tert-butylphenyl) phosphite as the phosphorus-based antioxidant.

[7]
The polyester resin composition according to any one of [3] to [6], wherein the phenol-based antioxidant is 1,3,5-tris(3,5-di-tert-butyl-4-hydroxybenzyl)-1,3,5-triazine-2,4,6(1H,3H,5H)-trione.

[8]
The polyester resin composition according to any one of [3] to [7], wherein the phosphorus-based antioxidant is 3,9-bis(2,6-di-tert-butyl-4-methylphenoxy)-2,4,8,10-tetraoxa-3,9-diphosphaspiro[5.5]undecane.

[9]
The polyester resin composition according to any one of [3] to [8], wherein a content of the phenol-based antioxidant is 0.005 to 1 part by mass based on 100 parts by mass of the polyester resin.

[10]
The polyester resin composition according to any one of [3] to [9], wherein a content of the phosphorus-based antioxidant is 0.005 to 1 part by mass based on 100 parts by mass of the polyester resin.

Advantageous Effects of Invention

A polyester resin composition of the present invention can maintain transparency and can also prevent deterioration of appearance due to yellow coloring even when used in a high temperature environment.

DESCRIPTION OF EMBODIMENTS

Hereinafter, an embodiment for carrying out the present invention (hereinafter, simply referred to as the "present embodiment") will be described in detail. The present embodiment described below is only illustrative of the present invention and is not intended to limit the present invention to the contents of the following description. The present invention can be carried out with appropriate modifications falling within the gist of the invention.

[Resin Composition]

A polyester resin composition of the present embodiment comprises:
a polyester resin comprising a unit (A) represented by the following general formula (1); and
an antioxidant.

Being configured as such, the resin composition of the present embodiment can maintain transparency and can also prevent deterioration of appearance due to yellow coloring even when used in a high temperature environment.

The polyester resin in the present embodiment tends to be excellent in a variety of physical properties such as heat resistance and transparency due to the norbornane ring skeleton, and by combining such physical properties and an effect of preventing yellow coloring that the antioxidant has, an effect desired by the present embodiment can be obtained. That is, the resin composition of the present embodiment can remarkably enhance the effect of preventing yellow coloring when used in a high temperature environment, compared to the case in which a publicly known polymer, such as a COP, and an antioxidant are combined, and it can also maintain transparency.

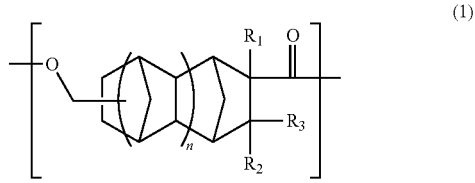

(1)

(In the above general formula (1), $R_1$ is a hydrogen atom, $CH_3$ or $C_2H_5$, $R_2$ and $R_3$ are each independently a hydrogen atom or $CH_3$, and n is 0 or 1.)

(Polyester Resin)

A polyester resin in the present embodiment is not particularly limited as long as it has a unit (A) represented by the above general formula (1) (hereinafter, also referred to as the "unit (A)"), but it is preferable that such a polyester resin be a copolymerized polyester resin (hereinafter, also simply referred to as the "copolymerized polyester resin") that has the unit (A), a diol unit (B) (hereinafter, also referred to as the "unit (B)") and a unit (C) derived from a dicarboxylic acid or an ester-forming derivative of the dicarboxylic acid (hereinafter, also referred to as the "unit (C)"), wherein the content of the unit (A) in all of the units that the copolymerized polyester resin has is 10 to 95 mol %.

In the present embodiment, when the content of the unit (A) based on all of the units that the copolymerized polyester resin has is 10 to 95 mol %, there is a tendency that the balance between heat resistance and optical characteristics will be better. That is, when the above content is 10 mol % or more, there is a tendency that sufficient heat resistance and optical characteristics are ensured, and when the above content is 95 mol % or less, there is a tendency that good heat resistance and optical characteristics are ensured while improving formability. From the same viewpoint as described above, the content of the unit (A) is preferably 15 to 95 mol % and more preferably 20 to 95 mol %.

In the unit (A), $R_1$ in the general formula (1) is preferably a hydrogen atom or $CH_3$, and $R_2$ and $R_3$ are each preferably a hydrogen atom. In the present embodiment, $R_1$, $R_2$ and $R_3$ in the general formula (1) are each more preferably a hydrogen atom from the viewpoint of heat resistance.

In addition, n in the above general formula (1) is preferably 1 from the viewpoint of further improving the heat resistance.

The constitutional unit (B) is not particularly limited as long as it is a unit derived from a diol. Specific examples thereof include a unit derived from the following diols: ethylene glycol, trimethylene glycol, 1,4-butanediol, 1,5-pentanediol, 1,6-hexanediol, diethylene glycol, propylene glycol, neopentyl glycol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclopentadecanedimethanol, norbornanediol, cyclohexanediol, 2,2'-bis(4-hydroxycyclohexyl)propane, adamantanediol, 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-phenylphenyl]fluorene, 9,9-bis(2-hydroxyethyl)fluorene, xylylene glycol, 3,9-bis(1,1-dimethyl-2-hydroxyethyl)-2,4,8,10-tetraoxaspiro[5.5]undecane, 1,4:3,6-dianhydro-D-sorbitol and 2,2,4,4-tetramethyl-1,3-cyclobutanediol.

It is preferable that the constitutional unit (B) be a unit derived from an aliphatic diol or a diol having a cardo structure in view of obtaining good transparency. Such a unit derived from an aliphatic diol is more preferably a unit derived from 1,4-cyclohexanedimethanol, ethylene glycol, tricyclodecanedimethanol, 3,9-bis(1,1-dimethyl-2-hydroxyethyl)-2,4,8,10-tetraoxaspiro[5,5]undecane, 1,4:3,6-dianhydro-D-sorbitol and 2,2,4,4-tetramethyl-1,3-cyclobutanediol. Also, the unit derived from a diol having a cardo structure is more preferably a unit derived from 9,9-bis[4-(2-hydroxyethoxy)phenyl]fluorene, 9,9-bis[4-(2-hydroxyethoxy)-3-methylphenyl]fluorene and 9,9-bis[4-(2-hydroxyethoxy)-3-phenylphenyl]fluorene.

Note that the optical isomerism of these diols is not particularly limited, and they may be a cis isomer, a trans isomer or a mixture thereof.

The content of the unit (B) based on all of the units that the copolymerized polyester resin has is preferably 2.5 to 45 mol % and more preferably 2.5 to 40 mol %.

One of the above units may be contained alone, or two or more of the above units may be contained in combination.

The constitutional unit (C) is not particularly limited as long as it is a unit derived from a dicarboxylic acid or an ester-forming derivative of the dicarboxylic acid. Specific examples thereof include: a constitutional unit derived from aromatic dicarboxylic acids such as terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid and tetralindicarboxylic acid, and/or derivatives of these aromatic dicarboxylic acids; a unit derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, 1,4:5,8-dimethanodecahydronaphthalenedicarboxylic acid, adamantanedicarboxylic acid and dimer acids, and/or derivatives of these aliphatic dicarboxylic acids; and a unit derived from dicarboxylic acids having a cardo structure such as 9,9-bis(carboxymethyl)fluorene, 9,9-bis(1-carboxyethyl)fluorene, 9,9-bis(2-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-)methylpropyl)fluorene, 9,9-bis(2-carboxybutyl)fluorene, 9,9-bis(2-carboxy-1-methylbutyl)fluorene, 9,9-bis(5-carboxypentyl)fluorene and 9,9-bis(4-carboxyphenyl)fluorene, and/or derivatives of these dicarboxylic acids having a cardo structure.

It is preferable that the constitutional unit (C) be a unit derived from an aliphatic dicarboxylic acid or an ester-forming derivative of the aliphatic dicarboxylic acid, or a unit derived from a dicarboxylic acid having a cardo structure or an ester-forming derivative of the dicarboxylic acid having a cardo structure in view of obtaining good transparency. The unit derived from an aliphatic dicarboxylic acid or an ester-forming derivative of the aliphatic dicarboxylic acid is more preferably a unit derived from dimethyl 1,4-cyclohexanedicarboxylate from the viewpoint of the physical property balance between transparency and heat resistance. The unit derived from a dicarboxylic acid having a cardo structure or an ester-forming derivative of the dicarboxylic acid having a cardo structure is more preferably a unit derived from 9,9-bis(methoxycarbonylmethyl)fluorene, 9,9-bis(methoxycarbonylethyl)fluorene and 9,9-bis(methoxycarbonylpropyl)fluorene from the viewpoint of the physical property balance between transparency and heat resistance.

Note that the optical isomerism of these diols is not particularly limited, and they may be a cis isomer, a trans isomer, or a mixture thereof.

The content of the unit (C) based on all of the units that the copolymerized polyester resin has is preferably 2.5 to 45 mol % and more preferably 2.5 to 40 mol %.

One of the above units may be contained alone, or two or more of the above units may be contained in combination.

In the present embodiment, the copolymerized polyester resin may comprise a hydroxyl group and a unit other than the units (A) to (C), and the other unit is, for example, a unit (A1) derived from a carboxylic acid or an ester-forming derivative of the carboxylic acid. The unit (A1) is not particularly limited, and examples thereof include a unit derived from oxyacids such as glycolic acid, lactic acid, hydroxybutyric acid, 2-hydroxyisobutyric acid, hydroxybenzoic acid, 6-hydroxycaproic acid and 4-hydroxycyclohexanecarboxylic acid, and/or derivatives of these oxyacids.

In the present embodiment, although the glass transition temperature (Tg) of the copolymerized polyester resin is not particularly limited, the glass transition temperature (Tg) is preferably 100° C. or higher, more preferably 105° C. or higher, even more preferably 110° C. or higher, yet even more preferably 115° C. or higher, still more preferably 120° C. or higher, and yet still more preferably 130° C. or higher, from the viewpoint of ensuring sufficient heat resistance. The above Tg can be measured according to the method described in Examples below. In addition, the above Tg can be adjusted within the above range, for example, by appropriately adjusting the proportions of starting monomers for the copolymerized polyester resin in copolymerization.

In the present embodiment, the molecular weight of the copolymerized polyester resin can be appropriately set in consideration of desired performance and the handleability and is not particularly limited, and the weight average molecular weight (Mw) in terms of polystyrene is preferably 5,000 to 200,000 and more preferably 10,000 to 100,000. When the Mw is 5,000 or more, there is a tendency that heat resistance can be preferably ensured, and when the Mw is 200,000 or less, there is a tendency that the melt viscosity becomes better, it becomes easier to remove the resin after production, and furthermore, it becomes easier to perform injection molding in a molten state from the viewpoint of fluidity.

(Method of Producing Copolymerized Polyester Resin)

The copolymerized polyester resin in the present embodiment can be obtained by copolymerization of monomers corresponding to the units (A) to (C). Hereinafter, a method of producing a monomer corresponding to the unit (A) will be described. Such a monomer is represented by, for example, the following general formula (2).

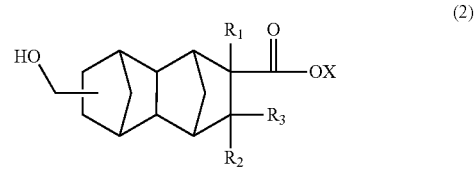

(2)

In the above general formula (2), $R_1$ is a hydrogen atom, $CH_3$ or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In the formula (2), $R_1$ is preferably a hydrogen atom or $CH_3$. $R_2$ and $R_3$ are each preferably a hydrogen atom. Examples of the above hydrocarbon group include, but are not limited to, a methyl group, an ethyl group, a propyl group, a butyl group, a vinyl group, a 2-hydroxyethyl group and a 4-hydroxybutyl group.

The compound represented by the general formula (2) in the present embodiment can be synthesized by, for example, a route represented by the following formula (I) using dicyclopentadiene or cyclopentadiene and an olefin having a functional group as starting materials.

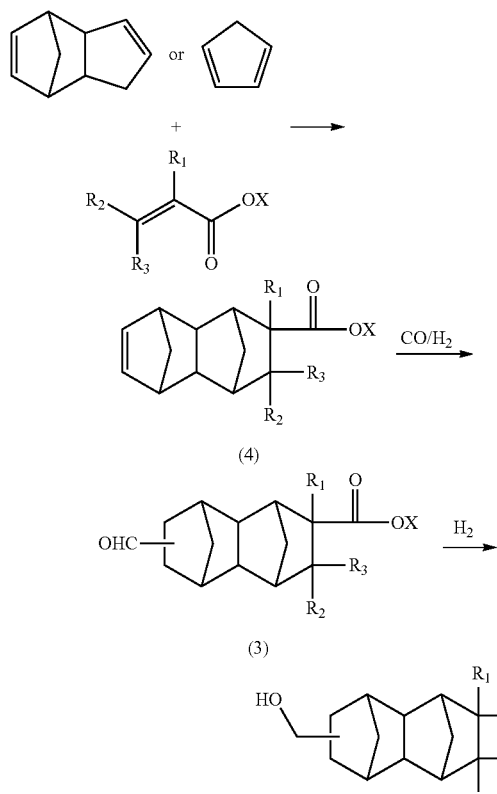

(In the formula (I), $R_1$ is a hydrogen atom, $CH_3$ or $C_2H_5$, $R_2$ and $R_3$ are each independently a hydrogen atom or $CH_3$, X is a hydrogen atom or a hydrocarbon group having four or less carbon atoms and optionally containing a hydroxyl group.)

[Production of Monoolefin Having 13 to 21 Carbon Atoms Represented by General Formula (4) in Formula (I)]

The monoolefin having 13 to 21 carbon atoms represented by the above general formula (4) can be produced by, for example, a Diels-Alder reaction between an olefin having a functional group and dicyclopentadiene.

Specific examples of the olefin having a functional group used for the above Diels-Alder reaction include, but are not limited to, methacrylic acid, methyl methacrylate, ethyl methacrylate, propyl methacrylate, butyl methacrylate, vinyl methacrylate, 2-hydroxyethyl methacrylate, 4-hydroxybutyl methacrylate, acrylic acid, methyl acrylate, ethyl acrylate, propyl acrylate, butyl acrylate, vinyl acrylate, 2-hydroxyethyl acrylate, 4-hydroxybutyl acrylate, crotonic acid, methyl crotonate, ethyl crotonate, 3-methylcrotonic acid, methyl 3-methylcrotonate and ethyl 3-methylcrotonate. Preferred examples of the olefin include methacrylic acid, methyl methacrylate, 2-hydroxyethyl methacrylate, acrylic acid, methyl acrylate and 2-hydroxyethyl acrylate, and more preferred examples of the olefin include methyl methacrylate and methyl acrylate.

Furthermore, examples of the olefin having a functional group used for the above Diels-Alder reaction include acrylonitrile, methacrylonitrile, acrolein and methacrolein. When these olefins are used as starting materials, a monoolefin represented by the general formula (4') can be produced by, for example, a route represented by the following formula (II) or formula (III).

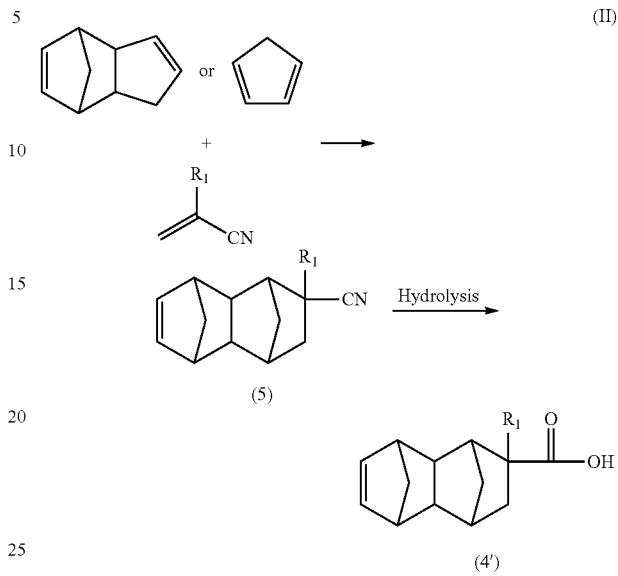

(In the formula (II), $R_1$ is a hydrogen atom or $CH_3$.)

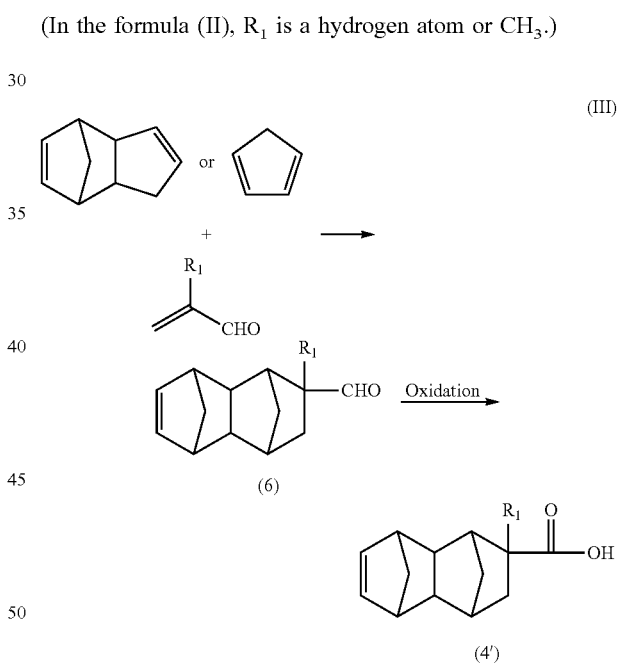

(In the formula (III), $R_1$ is a hydrogen atom or $CH_3$.)

The dicyclopentadiene used for the above Diels-Alder reaction is preferably highly pure, and it is preferable that the contents of butadiene, isoprene and other substances be reduced. The purity of the dicyclopentadiene is preferably 90% or more and more preferably 95% or more. In addition, dicyclopentadiene is prone to be depolymerized into cyclopentadiene (so-called monocyclopentadiene) under heating conditions, and thus, it is also possible to use cyclopentadiene instead of dicyclopentadiene. Note that the monoolefin having 13 to 21 carbon atoms represented by the general formula (4) is thought to be produced substantially via a monoolefin having 8 to 16 carbon atoms represented by the following general formula (7) (product of first Diels-Alder reaction), and that the produced monoolefin of the general formula (7) is thought to act as a new diene-reactive compound (dienophile) which is involved in the Diels-Alder reaction (second Diels-Alder reaction) with cyclopentadiene (diene) present in the reaction system to produce the monoolefin having 13 to 21 carbon atoms represented by the general formula (4).

In view of these points, for example, the monoolefin having 13 to 21 carbon atoms represented by the formula (4) or the monoolefin having 8 to 16 carbon atoms represented by the formula (7) can be selectively obtained by appropriately controlling the reaction conditions of the first Diels-Alder reaction in the reaction route represented by the above formula (I).

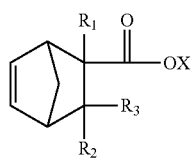

(7)

(In the formula (7), $R_1$ is a hydrogen atom, $CH_3$ or $C_2H_5$, $R_2$ and $R_3$ are each independently a hydrogen atom or $CH_3$, X is a hydrogen atom or a hydrocarbon group having four or less carbon atoms and optionally containing a hydroxyl group.)

From the viewpoint of allowing the above two-step Diels-Alder reaction to proceed efficiently, that is, from the viewpoint of selectively obtaining the monoolefin having 13 to 21 carbon atoms represented by the formula (4), the presence of cyclopentadiene in the reaction system is important. Therefore, the reaction temperature is preferably 100° C. or higher, more preferably 120° C. or higher, and even more preferably 130° C. or higher. On the other hand, in order to selectively obtain the monoolefin having 8 to 16 carbon atoms represented by the formula (7), the reaction temperature is preferably lower than 180° C. Note that, in either case, the reaction is preferably carried out at a temperature of 250° C. or lower in order to inhibit formation of a high-boiling substance as a by-product.

The monoolefin having 13 to 21 carbon atoms represented by the formula (4) obtained as described above can be subjected to a hydroformylation reaction and reduction reaction, which will be described below, to obtain a monomer corresponding to the unit represented by the formula (1) wherein n=1 (that is, a compound represented by the formula (2)). In addition, the monoolefin having 8 to 16 carbon atoms represented by the formula (7) obtained as described above can be subjected to a similar hydroformylation reaction and reduction reaction to obtain a monomer corresponding to the unit represented by the formula (1) wherein n=0 (that is, a compound represented by the formula (8)).

Note that it is also possible to use a hydrocarbon, an alcohol, an ester or the like as the reaction solvent, and for example, an aliphatic hydrocarbon having 6 or more carbon atoms, cyclohexane, toluene, xylene, ethylbenzene, mesitylene, propanol and butanol are preferable. In addition, a publicly known catalyst such as $AlCl_3$ may be added, if necessary.

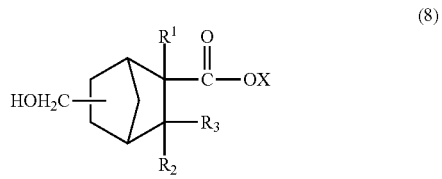

(8)

(In the above formula (8), $R_1$ is a hydrogen atom, $CH_3$ or $C_2H_5$, $R_2$ and $R_3$ are each independently a hydrogen atom or $CH_3$, and X is a hydrogen atom or a hydrocarbon group having four or less carbon atoms and optionally containing a hydroxyl group.)

The Diels-Alder reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate is made to flow in a tubular reactor under predetermined reaction conditions.

The reaction product as obtained by the above Diels-Alder reaction may directly be used as a starting material for the subsequent hydroformylation reaction or may be purified by a technique such as distillation, extraction or crystallization prior to being subjected to the subsequent step.

[Production of Difunctional Compound Having 14 to 22 Carbon Atoms Represented by (3) in Formula (I)]

The difunctional compound having 14 to 22 carbon atoms represented by the general formula (3) in the above formula (I) can be produced by, for example, subjecting the monoolefin having 13 to 21 carbon atoms represented by the general formula (4), carbon monoxide gas and hydrogen gas to a hydroformylation reaction in the presence of a rhodium compound and an organophosphorus compound.

The rhodium compound used in the above hydroformylation reaction may be any compound that forms a complex with an organophosphorus compound and that exhibits hydroformylation activity in the presence of carbon monoxide and hydrogen, and the form of the precursor of the rhodium compound is not particularly limited. For example, a catalyst precursor such as dicarbonylacetylacetonato rhodium (hereinafter, referred to as "Rh(acac)(CO)$_2$"), $Rh_2O_3$, $Rh_4(CO)_{12}$, $Rh_6(CO)_{16}$ or $Rh(NO_3)_3$ may be introduced, together with an organophosphorus compound, into a reaction mixture, and thus a rhodium carbonyl hydride-phosphorus complex having catalytic activity may be formed in a reaction vessel. Alternatively, a rhodium carbonyl hydride-phosphorus complex may be prepared beforehand, and the prepared complex may be introduced into a reactor. A specific example of preferred methods is a method in which Rh(acac)(CO)$_2$ is allowed to react with an organophosphorus compound in the presence of a solvent and then the reaction product is introduced together with excess of the organophosphorus compound into a reactor so as to give a rhodium-organophosphorus complex having catalytic activity.

Investigations by the present inventors have revealed that a two-step Diels-Alder reaction product represented by the general formula (4) that has an internal olefin with a relatively high molecular weight can be hydroformylated with an extremely small amount of rhodium catalyst. The amount of the rhodium compound to be used in the hydroformylation reaction is preferably 0.1 to 60 micromoles, more preferably 0.1 to 30 micromoles, even more preferably 0.2 to 20 micromoles, and particularly preferably 0.5 to 10 micromoles, based on 1 mole of the monoolefin having 13 to 21 carbon atoms represented by the general formula (4), which is a substrate in the hydroformylation reaction. When the amount of the rhodium compound to be used is less than 60 micromoles based on 1 mole of the monoolefin having 13 to 21 carbon atoms, it can be considered that there is no practical need for any installation for collecting and recycling the rhodium complex. As such, the present embodiment enables reduction in economic burden associated with collecting/recycling installations, thereby allowing reduction in costs associated with the rhodium catalyst.

The organophosphorus compound that forms the hydroformylation reaction catalyst for the hydroformylation reaction in the present embodiment together with the rhodium compound is not particularly limited, and examples of the organophosphorus compound include a phosphine represented by the general formula $P(-R_a)(-R_b)(-R_c)$ and a phosphite represented by the general formula $P(-OR_a)(-OR_b)(-OR_c)$. Specific examples of $R_a$, $R_b$ and $R_c$ include, but are not limited to, an aryl group that is optionally substituted with an alkyl group or alkoxy group having 1 to 4 carbon atoms and an alicyclic alkyl group that is optionally substituted with an alkyl group or alkoxy group having 1 to 4 carbon atoms. Triphenylphosphine and triphenyl phosphite are suitably used. The amount of the organophosphorus compound to be used is preferably 300 to 10000 times, more preferably 500 to 10000 times, even more preferably 700 to 5000 times, and particularly preferably 900 to 2000 times, the amount of rhodium atoms in the rhodium compound on a molar basis. When the amount of the organophosphorus compound to be used is 300 or more times the amount of rhodium atoms on a molar basis, there is a tendency that sufficient stability of the rhodium carbonyl hydride-phosphorus complex serving as a catalytically active material can be ensured, with the result that good reactivity tends to be ensured. In addition, the reason why the amount of the organophosphorus compound to be used is preferably 10000 or less times the amount of rhodium atoms on a molar basis is that, in this case, the cost spent on the organophosphorus compound can be sufficiently reduced.

The hydroformylation reaction can be carried out without the use of any solvent. However, with the use of a solvent inert in the reaction, the reaction can be accomplished in a more suitable manner. The solvent that can be used in the hydroformylation reaction is not particularly limited as long as it can dissolve a monoolefin having 13 to 21 carbon atoms represented by the general formula (4), dicyclopentadiene or cyclopentadiene, the rhodium compound and the organophosphorus compound. Specific examples of the solvent include, but are not limited to: a hydrocarbon such as an aliphatic hydrocarbon, an alicyclic hydrocarbon and an aromatic hydrocarbon; an ester such as an aliphatic ester, an alicyclic ester and an aromatic ester; an alcohol such as an aliphatic alcohol and an alicyclic alcohol; and a solvent such as an aromatic halide. Among the above, a hydrocarbon is suitably used, and in particular, an alicyclic hydrocarbon and an aromatic hydrocarbon are more suitably used.

The temperature at which the hydroformylation reaction is carried out is preferably 40° C. to 160° C. and more preferably 80° C. to 140° C. When the reaction temperature is 40° C. or higher, a sufficient reaction rate tends to be achieved, and the monoolefin as a starting material tends to be prevented from remaining unreacted. In addition, setting the reaction temperature to 160° C. or lower tends to reduce formation of by-products derived from the starting monoolefin or the reaction product and effectively prevent decrease in reaction performance.

The hydroformylation reaction in the present embodiment is preferably carried out under pressurization with carbon monoxide (hereinafter, occasionally referred to as "CO") gas and hydrogen (hereinafter, occasionally referred to as "$H_2$") gas. In this case, the CO and $H_2$ gases can be each independently introduced into the reaction system or can be introduced into the reaction system together in the form of a mixed gas prepared beforehand. The molar ratio between the CO and $H_2$ gases ($=CO/H_2$) introduced into the reaction system is preferably 0.2 to 5, more preferably 0.5 to 2, and even more preferably 0.8 to 1.2. When the molar ratio between the CO and $H_2$ gasses is adjusted within the above range, the activity of the hydroformylation reaction or the selectivity to the intended aldehyde tends to be increased. The amount of the CO and $H_2$ gases introduced into the reaction system decreases as the reaction proceeds, and thus the use of a $CO/H_2$ mixed gas prepared beforehand may facilitate the reaction control.

The reaction pressure in the hydroformylation reaction is preferably 1 to 12 MPa, more preferably 1.2 to 9 MPa, and even more preferably 1.5 to 5 MPa. Setting the reaction pressure to 1 MPa or more tends to provide a sufficient reaction rate, and tends to sufficiently prevent the monoolefin as a starting material from remaining unreacted. Also, setting the reaction pressure to 12 MPa or less eliminates the need for any expensive installation having high pressure resistance and is therefore economically advantageous. In particular, when the reaction is carried out in a batch mode or semibatch mode which involves depressurization by discharge of the CO and $H_2$ gases after completion of the reaction, a lower reaction pressure causes a smaller loss of the CO and $H_2$ gases and is therefore more economically advantageous.

The suitable reaction mode of the hydroformylation reaction is a batch reaction or semibatch reaction. The semibatch reaction can be carried out by placing the rhodium compound, the organophosphorus compound and the solvent in a reactor, creating the previously described reaction conditions through pressurization with a $CO/H_2$ gas and/or heating, and then supplying the monoolefin as a starting material or a solution of the monoolefin to the reactor.

The reaction product as obtained by the hydroformylation reaction may directly be used as a starting material for the subsequent reduction reaction or may be purified by, for example, distillation, extraction or crystallization prior to being subjected to the subsequent step.

[Production of Compound Having 14 to 22 Carbon Atoms Represented by Formula (2)]

The compound having 14 to 22 carbon atoms represented by the general formula (2) in the above formula (I) can be produced by a reduction reaction of the compound having 14 to 22 carbon atoms represented by the general formula (3) in the presence of a catalyst having hydrogenation activity and hydrogen.

In the reduction reaction, a catalyst containing at least one element selected from the group consisting of copper, chromium, iron, zinc, aluminum, nickel, cobalt and palladium is preferably used as the catalyst having hydrogenation activity. Examples of more preferred catalysts include a Cu—Cr catalyst, a Cu—Zn catalyst and a Cu—Zn—Al catalyst and further include a Raney-Ni catalyst and a Raney-Co catalyst. A Cu—Cr catalyst and a Raney-Co catalyst are even more preferred.

The amount of the hydrogenation catalyst to be used is 1 to 100% by mass, preferably 2 to 50% by mass, and more preferably 5 to 30% by mass, based on the compound having 14 to 22 carbon atoms represented by the general formula (3), which is a substrate. Setting the amount of the catalyst to be used within these ranges enables the hydrogenation reaction to take place in a suitable manner. When the amount of the catalyst to be used is 1% by mass or more, the reaction tends to be achieved sufficiently to ensure a sufficient yield of the intended product. In addition, when the amount of the catalyst to be used is 100% by mass or less, a good balance tends to be established between the amount of the catalyst subjected to the reaction and the increasing effect on the reaction rate.

The reaction temperature in the reduction reaction is preferably 60 to 200° C. and more preferably 80° C. to 150° C. Setting the reaction temperature to 200° C. or lower tends to prevent the occurrence of side reaction or decomposition reaction and give the intended product in a high yield. In addition, setting the reaction temperature to 60° C. or higher tends to allow completion of the reaction in a moderate period of time and enable avoidance of decrease in productivity or decrease in yield of the intended product.

The reaction pressure in the reduction reaction, as expressed by a hydrogen partial pressure, is preferably 0.5 to 10 MPa and more preferably 1 to 5 MPa. Setting the hydrogen partial pressure to 10 MPa or less tends to prevent the occurrence of side reaction or decomposition reaction and give the intended product in a high yield. In addition, setting the hydrogen partial pressure to 0.5 MPa or more tends to allow completion of the reaction in a moderate period of time and enable avoidance of decrease in productivity or decrease in yield of the intended product. Note that, in the reduction reaction, an inert gas (such as nitrogen or argon) may be additionally present.

In the reduction reaction, a solvent can be used. Examples of the solvent used in the reduction reaction include an aliphatic hydrocarbon, an alicyclic hydrocarbon, an aromatic hydrocarbon and an alcohol, among which an alicyclic hydrocarbon, an aromatic hydrocarbon and an alcohol are preferred. Specific examples of the solvent include cyclohexane, toluene, xylene, methanol, ethanol and 1-propanol.

The reduction reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate or substrate solution is made to flow in a tubular reactor filled with a forming catalyst under predetermined reaction conditions.

The reaction product obtained by the reduction reaction can be purified by, for example, distillation, extraction or crystallization.

The method used in the present embodiment to copolymerize the compound represented by the general formula (2) or the compound represented by the formula (8) as a monomer corresponding to the unit (A) with other monomers corresponding to the units (B) and (C) is not particularly limited, and a conventionally publicly known method for producing polyester can be employed. Examples of the method include: melt polymerization methods such as transesterification and direct esterification; and solution polymerization methods.

For production of the copolymerized polyester resin of the present embodiment, a catalyst used for production of common polyester resins, such as a transesterification catalyst, an esterification catalyst or a polycondensation catalyst, may be used. The catalyst is not particularly limited, and examples thereof include: a compound (for example, a fatty acid salt, a carbonic acid salt, a phosphoric acid salt, a hydroxide, a chloride, an oxide and an alkoxide) of a metal such as zinc, lead, cerium, cadmium, manganese, cobalt, lithium, sodium, potassium, calcium, nickel, magnesium, vanadium, aluminum, titanium, antimony, germanium and tin; and metallic magnesium. These catalysts can be used alone or can be used in combination of two or more kinds. Among the above examples, preferred catalysts are compounds of manganese, cobalt, zinc, titanium, calcium, antimony, germanium and tin. Compounds of manganese, titanium, antimony, germanium and tin are more preferred. The amount of such a catalyst to be used is not particularly limited, and the catalyst amount on a metal component basis is preferably 1 to 1000 ppm, more preferably 3 to 750 ppm, and even more preferably 5 to 500 ppm, based on the starting materials for the polyester resin.

The reaction temperature in the polymerization reaction depends on the type and amount of the catalyst to be used and is typically selected in the range of 150° C. to 300° C. From the viewpoint of the reaction rate and coloring of the resulting resin, the reaction temperature is preferably 180° C. to 280° C. It is preferable that the pressure inside the reaction tank be initially atmospheric pressure and finally controlled to 1 kPa or less, more preferably to 0.5 kPa or less.

For the polymerization reaction, a phosphorus compound may be added if desired. Examples of the phosphorus compound include, but are not limited to, phosphoric acid, phosphorous acid, a phosphoric acid ester and a phosphorous acid ester. Examples of the phosphoric acid ester include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate and triphenyl phosphate. Examples of the phosphorous acid ester include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite and triphenyl phosphite. These phosphorus compounds can be used alone or can be used in combination of two or more kinds. The concentration of phosphorus atoms in the copolymerized polyester resin of the present embodiment is preferably 1 to 500 ppm, more preferably 5 to 400 ppm, and even more preferably 10 to 200 ppm.

Also, for production of the copolymerized polyester resin in the present embodiment, an etherification inhibitor, a stabilizer such as a thermal stabilizer or light stabilizer, and a polymerization modifier can be used.

The polyester resin composition of the present embodiment comprises an antioxidant. The antioxidant means an additive to be compounded to the resin for the purpose of preventing oxidative deterioration and yellow coloring due to heat, and preferred examples thereof include a phenol-based antioxidant and a phosphorus-based antioxidant.

Each of the phenol-based antioxidant and the phosphorus-based antioxidant may be used alone in a preferred manner. However, by using them in combination, there is a tendency that yellow coloring can be prevented more because the phosphorus-based antioxidant captures the peroxide generated by the function of the phenol-based antioxidant. Therefore, it is more preferable to use the phenol-based antioxidant and the phosphorus-based antioxidant in combination. That is, it is preferable that the antioxidant in the present embodiment comprise a phenol-based antioxidant and/or a phosphorus-based antioxidant.

Although the phenol-based antioxidant is not particularly limited, examples thereof include, for example, 2,6-di-tertbutylphenol, 2,6-di-tert-butyl-4-methylphenol, 2,6-di-tert-butyl-4-ethylphenol, 2-tert-butyl-4,6-dimethylphenol, 2,4,6-tri-tert-butylphenol, 2-tert-butyl-4-methoxyphenol, 3-methyl-4-isopropylphenol, 2,6-di-tert-butyl-4-hydroxymethylphenol, 2,2-bis(4-hydroxyphenyl)propane, bis(5-tert-butyl-4-hydroxy-2-methylphenyl) sulfide, 2,5-di-tert-amylhydroquinone, 2,5-di-tert-butylhydroquinone, 1,1-bis(3-tert-butyl-4-hydroxy-5-methylphenyl)butane, bis(3-tert-butyl-2-hydroxy-5-methylphenyl)methane, 2,6-bis(2-hydroxy-3-tert-butyl-5-methylbenzyl)-4-methylphenol, bis(3-tert-butyl-4-hydroxy-5-methylbenzyl) sulfide, bis(3-tert-butyl-5-ethyl-2-hydroxyphenyl)methane, bis(3,5-di-tert-butyl-4-hydroxyphenyl)methane, bis(3-tert-butyl-2-hydroxy-5-methylphenyl) sulfide, 1,1-bis(4-hydroxyphenyl)cyclohexane, ethylene bis[3,3-bis(3-tert-butyl-4-hydroxyphenyl)butyrate], bis[2-(2-hydroxy-3-tert-butyl-5-methylbenzyl)-4-methyl-6-tert-butylphenyl]terephthalate, 1,1-bis(2-hydroxy-3,5-dimethylphenyl)-2-methylpropane, 4-methoxyphenol, cyclohexylphenol, p-phenylphenol, catechol, hydroquinone, 4-tert-butylpyrocatechol, ethyl gallate, propyl gallate, octyl gallate, lauryl gallate, cetyl gallate, β-naphthol, 2,4,5-trihydroxybutyrophenone, tris(3,5-di-tert-butyl-4-hydroxyphenyl) isocyanurate, tris(4-tert-butyl-3-hydroxy-2,6-dimethylphenyl) isocyanurate, 1,3,5-trimethyl-2,4,6-tris(3,5-di-tert-butyl-4-hydroxybenzyl)benzene, 1,3,5-tris(3,5-di-tert-butyl-4-hydroxybenzyl)-1,3,5-triazine-2,4,6(1H,3H,5H)-trione, 1,6-bis[2-(3,5-di-tert-butyl-4-hydroxyphenyl)propionyloxy]hexane, pentaerythritol tetrakis[3-(3,5-di-tert-butyl-4-hydroxyphenyl)propionate], bis(3-cyclohexyl-2-hydroxy-5-methylphenyl)methane, bis[3-(3,5-di-tert-butyl-4-hydroxyphenyl)propionyloxyethyl] sulfide, n-octadecyl 3-(3,5-di-tert-butyl-4-hydroxyphenyl)propionate, bis[3-(3,5-di-tert-butyl-4-hydroxyphenyl)propionylamino]hexane, 2,6-bis(3-tert-butyl-2-hydroxy-5-methylphenyl)-4-methylphenol, bis[S-(4-tert-butyl-3-hydroxy-2,6-di-methylbenzyl)]thioterephthalate, tris[3-(3,5-di-tert-butyl-4-hydroxyphenyl)propionyloxyethyl] isocyanurate, 4,4',4''-(1-methylpropanyl-3-ylidene)tris(6-tert-butyl-m-cresol), 1,1,3-tris(3-tert-butyl-4-hydroxy-6-methylphenyl)butane, 2,4-dimethyl-6-tert-butylphenol, hydroxymethyl-2,6-di-tert-butylphenol, 2,6-di-tert-α-dimethylamino-p-cresol, 2,5-di-tert-butyl-4-ethylphenol, 4,4'-bis(2,6-di-tert-butylphenol), 4,4'-thiobis(6-tert-butyl-o-cresol), 4,4'-thiobis(6-tert-butyl-m-cresol), a diethyl ester of 3,5-di-tert-butyl-4-hydroxybenzenesulfonic acid, 2,2'-dihydroxy-3,3'-di(α-methylcyclohexyl)-5,5'-dimethyl-diphenylmethane, 6-(hydroxy-3,5-di-tert-butylanilino)-2,4-bis-octylthio-1,3,5-triazine, N,N'-hexamethylene-bis(3,5-di-tert-butyl-4-hydroxyhydrocinnamide), 2,2-thio[diethyl-bis-3(3,5-di-tert-butyl-4-hydroxyphenyl)propionate], a dioctadecyl ester of 3,5-di-tert-butyl-4-hydroxybenzenephosphonic acid, stearyl 3-(3,5-di-tert-butyl-4-hydroxyphenyl)propionate, tris[β-(3,5-di-tert-butyl-4hydroxyphenyl)propionyloxyethyl]isocyanurate, 1,1-bis(5-tert-butyl-2-methyl-4-hydroxyphenyl)butane, 2,2-thio-diethylenebis(3-(3,5-di-tert-butyl-4-hydroxyphenyl)propionate), 3,9-bis(2-(3-(3-tert-butyl-4-hydroxy-5-methylphenyl)-propionyloxy)-1,1-dimethylethyl)-2,4,8,10-tetraoxaspiro[5.5]undecane, 6-[3-(3-tert-butyl-4-hydroxy-5-methylphenyl)propoxy]-2,4,8,10-tetra-tert-butyldibenzo[d,f][1,3,2]dioxaphosphepine, triethylene glycol-bis(3-(3-tert-butyl-5-methyl-4-hydroxyphenyl)propionate), N,N'-bis(3-(3,5-di-tert-butyl-4-hydroxyphenyl)propionyl)hydrazine, 3,5-di-tert-butyl-4-hydroxybenzylphosphonate-diethyl ester, N,N'-hexamethylenebis[3-(3,5-di-tert-butyl-4-hydroxyphenyl) propanamide], 2,2'-ethylidenebis(4,6-di-tert-butylphenol), 2,4-bis(dodecylthiomethyl)-6-methylphenol, 1,6-hexanediolbis[3-(3,5-di-tert-butyl-4-hydroxyphenyl)propionate], calcium bis(ethyl 3,5-tert-butyl-4-hydroxybenzylphosphonate), 2,2-bis[4-(2-(3,5-di-tert-butyl-4-hydroxyhydrocinnamoyloxy))ethoxyphenyl]propane, 2,2'-methylenebis(4-methyl-6-tert-butylphenol), 2,4-bis(octylthiomethyl)-6-methylphenol, 4,4'-methylenebis(2,6-di-tert-butylphenol), 4,4'-butylidenebis(6-tert-butyl-3-methylphenol), distearyl 3,5-di-tert-butyl-4-hydroxybenzyl phosphonate and 2-tert-butyl-6-(3-tert-butyl-5-methyl-2-hydroxybenzyl)-4-methylphenyl acrylate.

Among the phenol-based antioxidants mentioned above, 1,3,5-tris(3,5-di-tert-butyl-4-hydroxybenzyl)-1,3,5-triazine-2,4,6(1H,3H,5H)-trione, 4,4',4''-(1-methylpropanyl-3-ylidene)tris(6-tert-butyl-m-cresol), n-octadecyl 3-(3,5-di-tert-butyl-4-hydroxyphenyl)propionate, pentaerythritol tetrakis[3-(3,5-di-tert-butyl-4-hydroxyphenyl)propionate] and 3,9-bis(2-(3-(3-tert-butyl-4-hydroxy-5-methylphenyl)-propionyloxy)-1,1-dimethylethyl)-2,4,8,10-tetraoxaspiro[5.5]undecane are preferred, and 1,3,5-tris(3,5-di-tert-butyl-4-hydroxybenzyl)-1,3,5-triazine-2,4,6(1H,3H,5H)-trione is particularly preferred.

The phenol-based antioxidants mentioned above may each be used alone, or two or more kinds of phenol-based antioxidants may be used in combination.

Although the phosphorus-based antioxidant is not particularly limited, examples thereof include, for example, hypophosphorous acids, phosphorous acids and esters thereof, such as triphenyl phosphite, tris(methylphenyl) phosphite, triisooctyl phosphite, tridecyl phosphite, tris(2-ethylhexyl) phosphite, 2-ethylhexyl diphenyl phosphite, tris (nonylphenyl) phosphite, tris(octylphenyl) phosphite, tris [decyl poly(oxyethylene)]phosphite, tris(cyclohexylphenyl) phosphite, tricyclohexyl phosphite, tri(decyl) thiophosphite, triisodecyl thiophosphite, phenyl bis(2-ethylhexyl) phosphite, phenyl diisodecyl phosphite, tetradecyl poly(oxyethylene) bis(ethylphenyl) phosphite, phenyl dicyclohexyl phosphite, phenyl diisooctyl phosphite, phenyl di(tridecyl) phosphite, diphenyl cyclohexyl phosphite, diphenyl isooctyl phosphite, diphenyl 2-ethylhexyl phosphite, isodecyl diphenyl phosphite, diphenyl cyclohexylphenyl phosphite, diphenyl (tridecyl) thiophosphite, nonylphenyl ditridecyl phosphite, phenyl p-tert-butylphenyl dodecyl phosphite, diisopropyl phosphite, bis[octadecyl poly(oxyethylene)]phosphite, octyl poly(oxypropylene) tridecyl poly(oxypropylene) phosphite, monoisopropyl phosphite, diisodecyl phosphite, diisooctyl phosphite, monoisooctyl phosphite, didodecyl phosphite, monododecyl phosphite, dicyclohexyl phosphite, monocyclohexyl phosphite, monododecyl poly (oxyethylene) phosphite, bis(cyclohexylphenyl) phosphite, monocyclohexyl phenyl phosphite, bis(p-tert-butylphenyl) phosphite, tetratridecyl 4,4'-isopropylidenediphenyl diphosphite, tetratridecyl 4,4'-butylidenebis(2-tert-butyl-5-methylphenyl) diphosphite, tetraisooctyl 4,4'-thiobis(2-tert-butyl-5-methylphenyl) diphosphite, tetrakis(nonylphenyl) poly (propyleneoxy)isopropyl diphosphite, tetratridecyl propyleneoxypropyl diphosphite, tetratridecyl 4,4'-isopropylidenedicyclohexyl diphosphite, pentakis(nonylphenyl) bis[poly(propyleneoxy)isopropyl]triphosphite, 3,9-bis(octadecyloxy)-2,4,8,10-tetraoxa-3,9-diphosphaspiro[5.5]undecane, 3,9-bis(2,6-di-tert-butyl-4-methylphenoxy)-2,4,8,10-tetraoxa-3,9-diphosphaspiro[5.5]undecane, heptakis (nonylphenyl) tetrakis[poly(propyleneoxy)isopropyl] pentaphosphite, heptakis(nonylphenyl) tetrakis(4,4'-isopropylidenediphenyl) pentaphosphite, decakis (nonylphenyl) heptakis(propyleneoxyisopropyl) octaphosphite, decaphenyl heptakis(propyleneoxyisopropyl) octaphosphite, bis(butoxycarboethyl) 2,2-dimethylenetrimethylene dithiophosphite, bis(isooctoxycarbomethyl) 2,2-dimethylene trimethylene dithiophosphite, tetradodecyl ethylene dithiophosphite, tetradodecyl hexamethylene dithiophosphite, tetradodecyl 2,2'-oxydiethylene dithiophosphite, pentadodecyl di(hexamethylene) trithiophosphite, diphenyl phosphite, 4,4'-isopropylidene-dicyclohexyl phosphite, 4,4'-isopropylidenediphenyl alkyl(C12 to C15) phosphite, 2-tert-butyl-4-[1-(3-tert-butyl-4-hydroxyphenyl)isopropyl]phenyl di(p-nonylphenyl) phosphite, ditridecyl 4,4'-butylidenebis(3-methyl-6-tert-butylphenyl) phosphite, dioctadecyl 2,2-dimethylene trimethylene diphosphite, tris(cyclohexylphenyl) phosphite, hexatridecyl 4,4',4"-1,1,3-butanetriyl-tris(2-tert-butyl-5-methylphenyl) triphosphite, tridodecyl thiophosphite, decaphenyl heptakis(propyleneoxyisopropyl) octaphosphite, dibutyl pentakis(2,2-dimethylene trimethylene) diphosphite, dioctyl pentakis(2,2-dimethylene trimethylene) diphosphite, didecyl 2,2-dimethylene trimethylene diphosphite, tris(nonylphenyl) phosphite, dilauryl hydrogen phosphite, triethyl phosphite, tridecyl phosphite, tristearyl phosphite, diphenyl monodecyl phosphite, monophenyl didecyl phosphite, diphenyl mono(tridecyl) phosphite, tetraphenyl dipropylene glycol diphosphite, tetraphenyl tetra(tridecyl)pentaerythritol tetraphosphite, hydrogenated bisphenol A phenol phosphite polymer, diphenyl hydrogen phosphite, bis(tridecyl)pentaerythritol diphosphite, bis(nonylphenyl)pentaerythritol diphosphite, dilauryl pentaerythritol diphosphite, distearyl pentaerythritol diphosphite, tris(4-tert-butylphenyl) phosphite, tris(2,4-di-tert-butylphenyl) phosphite, cyclic neopentanetetrayl bis(2,6-di-tert-butyl-4-methylphenyl) phosphite, hydrogenated bisphenol A pentaerythritol phosphite polymer, tetrakis(2,4-di-tert-butylphenyl) 4,4'-biphenylene phosphonite, bis(2,4-di-tert-butylphenyl)pentaerythritol diphosphite, bis(2,6-di-tert-butyl-4-methylphenyl)pentaerythritol diphosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine, 2,2'-methylenebis(4,6-di-tert-butylphenyl)octyl phosphite, ethyl diethyl phosphonoacetate, methyl acid phosphate, ethyl acid phosphate, 2,2'-methylenebis(4,6-di-tert-butylphenyl)-2-ethylhexyl phosphite, butyl acid phosphate, butoxyethyl acid phosphate, octyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphate, bisphenol A acid phosphate, diethyl phosphate, dibutyl phosphate, dioctyl phosphate, dilauryl phosphate, distearyl phosphate, diphenyl phosphate, bisnonylphenyl phosphate, hexamethylphosphoric triamide, trilauryl phosphite, triisodecyl phosphite and phenyl isodecyl phosphite, and their lithium, sodium, potassium, magnesium, calcium, barium, zinc and aluminum metal salt compounds; and phosphoric acids and esters thereof, such as triisodecyl phosphate, tridodecyl phosphate, trihexadecyl phosphate, trioctadecyl phosphate, dihexyl octadecyl phosphate, decyl dodecyl tridecyl phosphate, dinonyl 1-methylpentyl phosphate, bis(2-methylhexadecyl) pentadecyl phosphate, eicosyl bis(12-tridecenyl) phosphate, tris(cis-9-octadecenyl) phosphate, cis-9-octadecenyl dioctadecyl phosphate, ditetradecyl phosphate, diheptyl phosphate, dioctadecyl phosphate, didodecyl phosphate, nonyl tetradecyl phosphate, cis-9-octadecenyl octadecyl phosphate, hexadecyl decyl phosphate, dieicosyl phosphate, bis(cis-9-octadecenyl) phosphate, dodecyl phosphate, octadecyl phosphate, eicosyl phosphate and octyl phosphate, tris[methyl di(oxyethylene)] phosphate, tris[butyl di(oxyethylene)] phosphate, tris(2-methoxypropyl) phosphate, tris(hexoxyethyl) phosphate, tris[ethyl di(oxypropylene)] phosphate, tris[butyl poly(oxypropylene)] phosphate, tris[octyl poly(oxypropylene)] phosphate, tris[phenyl poly(oxypropylene)] phosphate, tris[dodecyl poly(oxyethylene)] phosphate, tris[propyl poly(oxyethylene)] phosphate, tris[2-(2-hydroxyethoxy) ethyl] phosphate, bis[ethyl di(oxyethylene)]2-(2-hydroxypropoxy)propyl phosphate, bis[methyl di(oxyethylene)]butyl poly(oxypropylene) phosphate, didodecyl ethyl di(oxypropylene) phosphate, tridecyl 2-methoxypropyl 2-hydroxyethyl di(oxyethylene) phosphate, bis[methyl di(oxyethylene)] tolyl phosphate, octyl ethyl di(oxyethylene) nonylphenyl phosphate, tetrakis(2-methoxyethyl) 2,2'-oxydiethyl diphosphate, tetrakis[ethyl di(oxyethylene)] 2,2'-oxybis(1-methylethyl)) diphosphate, tetrakis[acetyl di(oxyethylene)] 5,5'-oxybis(3-oxapentamethylene) diphosphate, bis[methyl tri(oxyethylene)] bis(2-methoxyethyl) O,O'-propylene di(oxypropylene) diphosphate, methyl di(oxyethylene) ethyl tri(oxypropylene) 2,2'-dimethylene trimethylene) diphosphate, tri(octadecyl) 2-octoxyethyl trimethylene diphosphate, bis[methyl di(oxypropylene) bis [ethyl tri(oxyethylene)] 4,4'-methylene diphenyl diphosphate, bis[tetradecyl poly(oxyethylene)] phosphate, bis[methyl di(oxyethylene)] phosphate bis(phenoxyethyl) phosphate, bis[2-hydroxypropyl poly(oxypropylene)] phosphate, hexadecyl 2-hydroxyethoxyethyl phosphate, cyclohexylphenyl propyl di(oxyethylene) phosphate, bis[hexyl poly(oxyethylene)] ethylene poly(oxyethylene) diphosphate, propyl di(oxypropylene) 2-hydroxypropyl di(oxypropylene) phosphate, bis[2-hydroxypropyl poly(oxypropylene)] phosphate, dodecyl 2-hydroxyethyl poly(oxyethylene) 4,4'-thiodiphenyl diphosphate, methyl di(oxyethylene) phosphate, 2-hydroxypropyl di(oxypropylene) phosphate, 2-hydroxypropyl poly(oxypropylene) phosphate and octadecyl poly(oxyethylene) phosphate, diphenyl phosphate, 2-ethylhexyldiphenyl phosphate, dibenzyl phosphate, triethyl phosphate, trimethyl phosphate, trioctyl phosphate, tricresyl phosphate, tris(4-tert-butylphenyl) phosphate, tris(butoxyethyl) phosphate and tri-n-butyl phosphate, and their lithium, sodium, potassium, magnesium, calcium, barium, zinc and aluminum metal salt compounds; and hypophosphorous acids and polyphosphoric acids.

Among the phosphorus-based antioxidants mentioned above, 3,9-bis(2,6-di-tert-butyl-4-methylphenoxy)-2,4,8,10-tetraoxa-3,9-diphosphaspiro[5.5]undecane and tris(2,4-di-tert-butylphenyl) phosphite are preferred, and 3,9-bis(2,6-di-tert-butyl-4-methylphenoxy)-2,4,8,10-tetraoxa-3,9-diphosphaspiro[5.5]undecane is particularly preferred.

The phosphorus-based antioxidants mentioned above may each be used alone, or two or more kinds of phosphorus-based antioxidants may be used in combination.

In the present embodiment, from the viewpoint of more effectively preventing yellow coloring in a high temperature environment, it is preferable that 1,3,5-tris(3,5-di-tert-butyl-4-hydroxybenzyl)-1,3,5-triazine-2,4,6(1H,3H,5H)-trione and/or pentaerythritol tetrakis[3-(3,5-di-tert-butyl-4-hydroxyphenyl)propionate] be contained as the phenol-based antioxidant and 3,9-bis(2,6-di-tert-butyl-4-methylphenoxy)-2,4,8,10-tetraoxa-3,9-diphosphaspiro[5.5]undecane and/or tris(2,4-di-tert-butylphenyl) phosphite be contained as the phosphorus-based antioxidant.

As the antioxidant in the present embodiment, other than those mentioned above, it is also possible to use a lactone-based antioxidant, a sulfur-based antioxidant, and other publicly known antioxidants.

Although the lactone-based antioxidant is not particularly limited, it is preferably 5,7-di-tert-butyl-3-(3,4-di-methylphenyl)-3H-benzofuran-2-one.

Although the sulfur-based antioxidant is not particularly limited, it is preferably 2,2-bis{[3-(dodecylthio)-1-oxy-propoxy]methyl}propan-1,3-diylbis[3-(dodecylthio)propionate] and di(tridecyl) 3,3'-thiodipropionate.

The content of the antioxidant used in the present embodiment is preferably 0.005 to 1 part by mass, more preferably 0.007 to 0.8 parts by mass, and even more preferably 0.01 to 0.7 parts by mass, based on the polyester resin used in the present embodiment. When the content is 0.005 parts by mass or more, there is a tendency that deterioration of the polyester resin (yellow coloring, generation of gel component, decrease in molecular weight, and the like) upon polymerization or upon heat processing during molding can be prevented in a preferred manner, and there is also tendency that sufficient heat yellowing resistance can be ensured. In addition, when the content is 1 part by mass or less, there is a tendency that problems such as bleed out to the metal mold during molding can be prevented in a preferred manner.

From the same viewpoint as described above, the content of the phenol-based antioxidant is preferably 0.005 to 1 part by mass, more preferably 0.007 to 0.8 parts by mass, and even more preferably 0.01 to 0.7 parts by mass, based on 100 parts by mass of the polyester resin. Similarly, the content of the phosphorus-based antioxidant is preferably 0.005 to 1 part by mass, more preferably 0.007 to 0.8 parts by mass, and even more preferably 0.01 to 0.7 parts by mass, based on 100 parts by mass of the polyester resin.

The polyester resin composition of the present embodiment may comprise one or more ultraviolet absorbing agents.

Although the ultraviolet absorbing agent is not particularly limited, examples thereof include, for example, an inorganic ultraviolet absorbing agent such as cerium oxide and zinc oxide; and an organic ultraviolet absorbing agent such as a benzotriazole-based compound, a benzophenone-based compound, a salicylate-based compound, a cyanoacrylate-based compound, a triazine-based compound, an oxanilide-based compound, a malonic acid ester compound, a hindered amine-based compound, an anilide oxalate-based compound and a benzoxazinone-based compound. Among the above, the organic ultraviolet absorbing agent is preferred, the benzotriazole-based compound, the triazine-based compound or the benzoxazinone-based compound is more preferred, and the benzotriazole-based compound (a compound having a benzotriazole structure) is particularly preferred.

Specific examples of the benzotriazole-based compound include, for example, 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl)benzotriazole, 2,2'-methylenebis[6-(benzotriazol-2-yl)-4-tert-octylphenol] and 2,2'-methylenebis[6-(2H-benzotriazol-2-yl)-4-(1,1,3,3-tetramethylbutyl)phenol], among which 2,2'-methylenebis[6-(2H-benzotriazol-2-yl)-4-(1,1,3,3-tetramethylbutyl)phenol] is preferred.

Specific examples of the benzophenone-based compound include, for example, 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone and 2,2'-dihydroxy-4,4'-dimethoxybenzophenone.

Specific examples of the salicylate-based compound include, but are not limited to, phenyl salicylate and 4-tert-butylphenyl salicylate.

Specific examples of the cyanoacrylate-based compound include, but are not limited to, ethyl-2-cyano-3,3-diphenylacrylate and 2-ethylhexyl 2-cyano-3,3-diphenylacrylate.

Specific examples of the oxanilide-based compound include, but are not limited to, 2-ethoxy-2'-ethyloxanilic acid bisanilide.

Although the malonic acid ester compound is not particularly limited, a 2-(alkylidene)malonic acid ester is preferred, and a 2-(1-arylalkylidene)malonic acid ester is more preferred.

Specific examples of the triazine-based compound include, but are not limited to, 2,4-bis[2-hydroxy-4-butoxyphenyl]-6-(2,4-dibutoxyphenyl)-1,3,5-triazine, 2-(2-hydroxy-4-[1-octyloxycarbonylethoxy]phenyl)-4,6-bis(4-phenylphenyl)-1,3,5-triazine, 2-(4,6-diphenyl-1,3,5-triazin-2-yl)-5-[2-(2-ethylhexanoyloxy)ethoxy]-phenol, 2-[4,6-bis(2,4-dimethylphenyl)-1,3,5-triazin-2-yl]-5-(octyloxy)phenol, 2-(4,6-diphenyl-1,3,5-triazin-2-yl)-5-[(hexyl)oxy]-phenol and 2,4,6-tris(2-hydroxy-4-hexoxy-3-methylphenyl)-1,3,5-triazine.

In the present embodiment, the content of the ultraviolet absorbing agent component that can be used can be 0.005 to 1 part by mass, preferably 0.007 to 0.8 parts by mass, and more preferably 0.01 to 0.7 parts by mass, based on the polyester resin in the present embodiment. When the content is 0.005 parts by mass or more, there is a tendency that sufficient weather resistance is ensured, and when the content is 1 part by mass or less, there is a tendency that problems such as bleed out to the metal mold during molding can be prevented in a preferred manner. In addition to those mentioned above, various publicly known ultraviolet absorbing agents may be used in combination as long as the effects of the present embodiment are not impaired.

To the polyester resin composition of the present embodiment, in addition to those described above, various additives and a forming aid can be added as long as the purpose of the present embodiment is not impaired, and examples of the additives include a light stabilizer, a plasticizer, an extender, a delustrant, a drying regulator, an anti-static agent, an anti-settling agent, a surfactant, a flow modifier, a drying oil, a wax, a colorant, a dispersing agent, a reinforcing agent, a surface smoothing agent, a leveling agent, a curing accelerator and a thickener. For the above, various publicly known additives can be used, and one of them may be added alone as one kind, or two or more of them may be added in combination to the resin composition.

The method of adding the antioxidant, the ultraviolet absorbing agent and the various other components mentioned above (hereinafter, also collectively referred to as "additives") that can be used in the present embodiment is not particularly limited, but employed are a method in which the polymerization reaction of the polyester resin is carried out in the presence of an additive to have it contained therein, a method in which an additive is added to the polyester resin in a molten state before extracting the polyester resin from the polymerization kettle in the polymerization step, a method in which the polyester resin is pelletized and an additive is dry blended, or a method in which an additive is added to the molten polyester resin using an extruder or the like.

For mixing or kneading the polyester resin and the additive component, a publicly known apparatus can be used, and examples thereof include, for example, a mixing or kneading apparatus, such as a tumbler, a high speed mixer, a Nauta mixer, a ribbon type blender, a mixing roll, a kneader, an intensive mixer, a single screw extruder and a twin screw extruder. In addition, a liquid mixing apparatus, such as a gate mixer, a butterfly mixer, a universal mixer, a dissolver and a static mixer, can also be used. Moreover, a resin containing the additive component at a high concentration and the polyester resin can also be mixed by the method and apparatus described above.

The polyester resin composition of the present embodiment can be in the form of a polyester resin composition comprising a resin other than the polyester resin in the present embodiment as long as an effect desired by the present embodiment is not impaired. As such a resin, without particular limitations, at least one resin selected from the group consisting of, for example, a polyester resin other than the polyester resin in the present embodiment, a polycarbonate resin, a (meth)acrylic resin, a polyamide resin, a polystyrene resin, an acrylonitrile-butadiene-styrene copolymer resin, a vinyl chloride resin, a polyphenylene ether resin, a polysulfone resin, a polyacetal resin and a methyl methacrylate-styrene copolymer resin can be further contained. For the above, various publicly known resins can be used, and one of them may be added alone as one kind, or two or more of them may be added in combination to the resin composition. It is preferable that the content of these resins be set to 10% by mass or less in the resin composition.

EXAMPLES

Hereinafter, the present invention will be described in more detail with examples. The scope of the present invention is not limited by the examples. Note that evaluation methods are as follows.
<Method for Evaluating Polyester Resin>
(1) Composition of Resin The proportions of the diol constitutional unit and the dicarboxylic acid constitutional unit in the polyester resin were calculated by $^1$H-NMR measurement. The measurement apparatus used was a nuclear magnetic resonance apparatus (available from JEOL Ltd., product name: JNM-AL400), and the measurement was conducted at 400 MHz. The solvent used was deuterated chloroform.
(2) Weight Average Molecular Weight (Mw)

The polyester resin was dissolved in tetrahydrofuran so as to have a concentration of 0.2% by mass, measured by gel permeation chromatography (GPC), and weighed using standard polystyrene. GPC was measured using a TSKgel SuperHM-M column available from Tosoh Corporation at a column temperature of 40° C. The eluent was run with tetrahydrofuran at a flow rate of 0.6 ml/min and measured with an RI detector.
(3) Glass Transition Temperature (Tg)

The glass transition temperature of the polyester resin was measured as follows. A differential scanning calorimeter (available from Shimadzu Corporation, product name: DSC/TA-60WS) was used, and a measurement sample was prepared by placing about 10 mg of the copolymerized polyester resin in an unsealed aluminum vessel, melting the polyester resin by heating to 280° C. at a temperature rise rate of 20° C./min under a stream of nitrogen gas (30 mL/min), and rapidly cooling the molten resin. This sample was subjected to measurement under the same conditions, and the glass transition temperature was determined as a temperature at which, in the DSC curve, the change reached ½ of the difference in the baseline before and after transition.
(4) Heat Yellowing Resistance The heat yellowing resistance was evaluated by storing a disc shaped test piece with a thickness of 3 mm and a diameter of 50 mm in a hot air dryer at 125° C. for 1000 hours, and then determining the difference in yellowness YI (ΔYI) in the thickness direction (optical path length 3 mm) before and after the test. Note that the measurement of yellowness was carried out according to JIS K7103 in an atmosphere of 23° C. and a relative humidity of 50% with a haze value measuring apparatus (model: COH-400) available from NIPPON DENSHOKU INDUSTRIES CO., LTD.
(5) Total Light Transmittance The total light transmittance was measured by storing a disc shaped test piece with a thickness of 3 mm and a diameter of 50 mm in a hot air dryer at 125° C. for 1000 hours, and then determining the total light transmittance in the thickness direction (optical path length 3 mm) before and after the test using a haze value measuring apparatus (model: COH-400) available from NIPPON DENSHOKU INDUSTRIES CO., LTD.

Examples 1 to 9

[Production of Polyester Resin]

A 10 L polyester production apparatus equipped with a partial condenser, a total condenser, a cold trap, a stirrer, a heater and a nitrogen inlet tube was charged with 4011.93 g of decahydro-1,4:5,8-dimethanonaphthalene-2-methoxycarbonyl-6(7)-methanol, 811.47 g of ethylene glycol and 506.68 g of dimethyl 1,4-cyclohexanedicarboxylate (cis/trans=7/3) as starting monomers, and 1.24 g of manganese acetate tetrahydrate as a transesterification catalyst, and the temperature was raised to 250° C. to carry out a transesterification reaction. After the reaction conversion rate of the dicarboxylic acid component reached 90% or more, 2.88 g of germanium oxide and 1.65 g of phosphoric acid were added, and temperature rise and pressure reduction were gradually performed, and polycondensation was finally carried out at 280° C. and 0.1 kPa or less. The reaction was terminated when the melt viscosity became appropriate, and polyester resins having a weight average molecular weight of 48000 and a glass transition temperature of 144° C. were produced. The proportions of the diol constitutional unit and the dicarboxylic acid constitutional unit in the produced polyester resin were as follows: decahydro-1,4:5,8-dimethanonaphthalene-2-methoxycarbonyl-6(7)-methanol, ethylene glycol, dimethyl 1,4-cyclohexanedicarboxylate (cis/trans=7/3) at 76 mol %, 12 mol % and 12 mol %, respectively.
[Production of Polyester Resin Composition]

Based on 100 parts by mass of the polyester resin, an antioxidant at an amount (unit: parts by mass) described in Table 1 and 0.1 parts by mass of calcium stearate as a release agent were dry mixed using a tumbler, and kneaded at a cylinder temperature of 260° C. using LABO PLASTOMILL available from Toyo Seiki Seisaku-sho, Ltd.

Note that the additives in the table were as follows.
Antioxidant 1: 1,3,5-tris(3,5-di-tert-butyl-4-hydroxybenzyl)-1,3,5-triazine-2,4,6(1H,3H,5H)-trione; "ADK STAB AO-20" available from ADEKA CORPORATION;

Antioxidant 2: 4,4',4"-(1-methylpropanyl-3-ylidene)tris(6-tert-butyl-m-cresol); "ADK STAB AO-30" available from ADEKA CORPORATION;
Antioxidant 3: n-octadecyl 3-(3,5-di-tert-butyl-4-hydroxyphenyl)propionate; "ADK STAB AO-50" available from ADEKA CORPORATION;
Antioxidant 4: pentaerythritol tetrakis[3-(3,5-di-tert-butyl-4-hydroxyphenyl)propionate]; "ADK STAB AO-60" available from ADEKA CORPORATION;
Antioxidant 5: 3,9-bis(2-(3-(3-tert-butyl-4-hydroxy-5-methylphenyl)-propionyloxy)-1,1-dimethylethyl)-2,4,8,10-tetraoxaspiro[5.5]undecane; "ADK STAB AO-80" available from ADEKA CORPORATION;
Antioxidant 6: 3,9-bis(2,6-di-tert-butyl-4-methylphenoxy)-2,4,8,10-tetraoxa-3,9-diphosphaspiro[5.5]undecane; "ADK STAB PEP-36" available from ADEKA CORPORATION; and
Antioxidant 7: tris(2,4-di-tert-butylphenyl) phosphite; "ADK STAB 2112" available from ADEKA CORPORATION.

[Fabrication of Test Piece]

The polyester resin compositions prepared in Examples 1 to 9 were molded into discs having a thickness of 3 mm and a diameter of 50 mm under the conditions of a cylinder temperature of 270° C. and a metal mold temperature of 130° C., using a screw type injection molding machine (J55AD available from The Japan Steel Works, LTD.), and these discs were used as the measurement sample for each Example.

Comparative Example 1

As shown in Table 1, production of a polyester resin composition and fabrication of a test piece were carried out in the same manner as in Example 1 except that no antioxidant was added, and the test piece was used as a measurement sample for Comparative Example 1.

REFERENCE EXAMPLE

A COP, ZEONEX F52R available from ZEON CORPORATION was prepared in place of the polyester resin of Example 1, and it was molded into, with no addition of an antioxidant, a disc having a thickness of 3 mm and a diameter of 50 mm under the conditions of a cylinder temperature of 270° C. and a metal mold temperature of 130° C., using a screw type injection molding machine (J55AD available from The Japan Steel Works, LTD.), and this disc was used as the measurement sample for Reference Example.

TABLE 1

| | | | Example 1 | Example 2 | Example 3 | Example 4 | Example 5 | Example 6 |
|---|---|---|---|---|---|---|---|---|
| Polyester resin (parts by mass) | | | 100 | 100 | 100 | 100 | 100 | 100 |
| Antioxidant (parts by mass) | Phenol-based | Antioxidant 1 | 0.1 | 0.1 | | | | |
| | | Antioxidant 2 | | | 0.2 | | | |
| | | Antioxidant 3 | | | | 0.2 | | |
| | | Antioxidant 4 | | | | | 0.1 | 0.1 |
| | | Antioxidant 5 | | | | | | |
| | | Antioxidant 6 | 0.03 | | 0.05 | 0.05 | 0.03 | |
| | Phosphorus-based | Antioxidant 7 | | 0.03 | | | | 0.03 |
| Heat resistance test (Δ YI) | | | 7 | 7 | 8 | 8 | 7 | 7 |
| Total light transmittance (%) | | | 90 | 90 | 90 | 90 | 90 | 90 |

| | | | Example 7 | Example 8 | Example 9 | Comparative Example 1 | Reference Example |
|---|---|---|---|---|---|---|---|
| Polyester resin (parts by mass) | | | 100 | 100 | 100 | 100 | COP |
| Antioxidant (parts by mass) | Phenol-based | Antioxidant 1 | | | | | |
| | | Antioxidant 2 | | | | | |
| | | Antioxidant 3 | | | | | |
| | | Antioxidant 4 | 0.2 | 0.3 | | | |
| | | Antioxidant 5 | | | 0.2 | | |
| | | Antioxidant 6 | | | 0.05 | | |
| | Phosphorus-based | Antioxidant 7 | 0.05 | 0.1 | | | |
| Heat resistance test (Δ YI) | | | 7 | 7 | 8 | 35 | 100 |
| Total light transmittance (%) | | | 90 | 90 | 90 | 85 | 70 |

The present application claims the priority based on Japanese Patent Application No. 2018-072574 filed in the Japan Patent Office on Apr. 4, 2018, the contents of which are incorporated herein by reference.

INDUSTRIAL APPLICABILITY

The polyester resin composition of the present invention is excellent in transparency and heat yellowing resistance. By using the polyester resin composition of the present invention, a molded article excellent in transparency and heat yellowing resistance can be produced, and it can be suitably used for a lens member such as a camera lens for smartphones, an on-vehicle camera lens, a LED lamp lens, a pickup lens, an f-θ lens, a lens for LED illumination and a spectacle lens; an optical member such as a light guide plate and an optical fiber; and an optical film material such as a retardation film That is, the present invention is of great industrial significance.

The invention claimed is:

1. A polyester resin composition, comprising:
an antioxidant; and
a polyester resin comprising a unit (A) of the following formula (1),

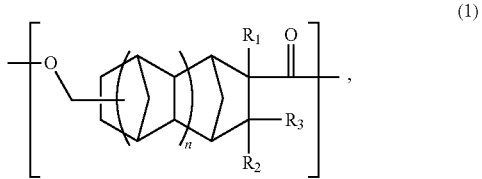

wherein $R_1$ is a hydrogen atom, $CH_3$ or $C_2H_5$, $R_2$ and $R_3$ are each independently a hydrogen atom or $CH_3$, and n is 0 or 1,
wherein the antioxidant comprises a phenol-based antioxidant, a phosphorus-based antioxidant, or a combination thereof,
wherein (i) the phenol-based antioxidant is 1,3,5-tris(3,5-di-tert-butyl-4-hydroxybenzyl)-1,3,5-triazine-2,4,6(1H,3H,5H)-trione, and/or (ii) the phosphorus-based antioxidant is 3,9-bis(2,6-di-tert-butyl-4-methylphenoxy)-2,4,8,10-tetraoxa-3,9-diphosphaspiro[5.5]undecane.

2. The polyester resin composition according to claim 1, wherein the polyester resin comprises the unit (A), a diol unit (B) and a unit (C) derived from a dicarboxylic acid or an ester-forming derivative of the dicarboxylic acid, and a content of the unit (A) is from 10 to 95 mol % based on total units of the polyester resin.

3. The polyester resin composition according to claim 1, wherein the polyester resin composition comprises 1,3,5-tris(3,5-di-tert-butyl-4-hydroxybenzyl)-1,3,5-triazine-2,4,6 (1H,3H,5H)-trione.

4. The polyester resin composition according to claim 1, wherein the polyester resin composition comprises 3,9-bis(2,6-di-tert-butyl-4-methylphenoxy)-2,4,8,10-tetraoxa-3,9-diphosphaspiro[5.5]undecane.

5. The polyester resin composition according to claim 1, wherein a content of the phenol-based antioxidant is from 0.005 to 1 part by mass based on 100 parts by mass of the polyester resin.

6. The polyester resin composition according to claim 1, wherein a content of the phosphorus-based antioxidant is from 0.005 to 1 part by mass based on 100 parts by mass of the polyester resin.

7. The polyester resin composition according to claim 1, wherein a content of the phenol-based antioxidant is from 0.007 to 0.8 part by mass based on 100 parts by mass of the polyester resin.

8. The polyester resin composition according to claim 1, wherein a content of the phosphorus-based antioxidant is from 0.007 to 0.8 part by mass based on 100 parts by mass of the polyester resin.

9. The polyester resin composition according to claim 1, wherein a content of the phenol-based antioxidant is from 0.01 to 0.7 part by mass based on 100 parts by mass of the polyester resin.

10. The polyester resin composition according to claim 1, wherein a content of the phosphorus-based antioxidant is from 0.01 to 0.7 part by mass based on 100 parts by mass of the polyester resin.

* * * * *

UNITED STATES PATENT AND TRADEMARK OFFICE
CERTIFICATE OF CORRECTION

| | |
|---|---|
| PATENT NO. | : 12,049,541 B2 |
| APPLICATION NO. | : 17/045041 |
| DATED | : July 30, 2024 |
| INVENTOR(S) | : Satake et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this
Sixth Day of May, 2025

Coke Morgan Stewart
*Acting Director of the United States Patent and Trademark Office*